United States Patent [19]
Dobson et al.

[11] Patent Number: 4,943,980
[45] Date of Patent: Jul. 24, 1990

[54] MULTI-CARRIER HIGH SPEED MODEM

[75] Inventors: W. Kurt Dobson, Salt Lake City; Donald L. Chaffee, Park City, both of Utah

[73] Assignee: Intelligent Modem Corporation, Midvale, Utah

[21] Appl. No.: 346,069

[22] Filed: May 2, 1989

[51] Int. Cl.$^5$ .................................................. H04B 15/00
[52] U.S. Cl. ........................................... 375/42; 375/58; 375/101
[58] Field of Search .................... 375/38, 39, 122, 8, 375/7, 40, 42, 58, 101; 381/29, 30, 31; 358/138; 382/56; 333/166, 167; 379/93; 370/118

[56] References Cited

U.S. PATENT DOCUMENTS

| | | | |
|---|---|---|---|
| 4,381,428 | 4/1983 | Kolesar et al. | 375/122 X |
| 4,495,620 | 1/1985 | Steel et al. | 375/122 X |
| 4,679,227 | 7/1987 | Hughes-Hartogs | 455/63 X |

*Primary Examiner*—Benedict V. Safourek
*Assistant Examiner*—Tesfaldet Bocure
*Attorney, Agent, or Firm*—Thorpe, North & Western

[57] ABSTRACT

A modem system includes a transmitter section having generators for successively generating sets of carrier signals where each carrier signal of a set has a different frequency and a modulator for modulating each carrier signal of a set with a different portion of digital data to be transmitted where all such portions used to modulate a set of carrier signals comprise a frame of digital data. Also included are an adder for successively combining together the modulated carrier signals of each set to produce a frame waveform, an inverse Fast Fourier Transform circuit for transforming each waveform from a frequency domain signal to a time domain signal, a rotate and match buffer circuit for rotating each transform waveform so that its beginning point amplitude and slope substantially match the ending point amplitude and slope of the immediately preceding transformed waveform, and a transmitter for successively and continuously transmitting the transformed and rotated waveforms over a telephone channel. The modem system also includes a receiver section having a circuit for receiving from the telephone channel transmitted signals, a rerotate circuit for rerotating each received waveform substantially to its original condition before rotating, a Fast Fourier Transform circuit for transforming each received, rerotated waveform from a time domain signal back to a frequency domain signal, and a demodulator for demodulating each received and rerotated waveform to recover the digital data transmitted.

8 Claims, 3 Drawing Sheets

MULTI-CARRIER HIGH SPEED MODEM

BACKGROUND OF THE INVENTION

This invention relates to a high speed data modem for transmitting and receiving data over common, band-limited telephone channels and the like, and more particularly to a modem which achieves high speed by reducing intersymbol gaps and delays without the normally attendant distortion.

Modems (an acronym for modulation/demodulation) were developed to enable transmitting digital data over low-grade, but pervasive, analog telephone voice channels. With the ability to transmit data over telephone channels, not only was the need for specially designed data transmission networks eliminated, or at least reduced, but also the number of possible originating and destination stations was greatly multiplied, limited only by the availability (or more precisely nonavailability) of a telephone line.

Modems operate by transforming binary (two-level) digital data signals into analog signals suitable for transmission over telephone channels and then, after transmission, transforming the analog signals back into the digital data signals. This conversion involves modulating or encoding the digital data onto a carrier signal or signals at the transmitting end, and demodulating or decoding the transmitted signals at the receiving end to recover the desired digital data.

Since the introduction of modems, development efforts have been directed to improving their speed and accuracy, resulting in systems capable of transmitting 9600 bits per second (see, for example, U.S. Pat. Nos. 4,206,320 and 4,771,417) and, most recently, 14,400 bits per second (see U.S. Pat. No. 4,646,305). Also see U.S. Pat. Nos. 3,955,141, 4,085,449, 4,355,397, 4,514,825, 4,653,044, 4,686,690, 4,734,920 and 4,796,279.

One of the problems which inhibits improvement in speed and accuracy of data transmission over telephone channels, at least for those systems which utilize multiple carriers (frequencies), is what is denoted "group delay distortion". This type of distortion comes about because of the difference in phase delay for different frequencies. The result of such distortion is that different frequencies of a transmitted composite analog signal arrive at the receiving end at different times, some frequencies lagging behind others, so that one signal symbol or frame may interfere with an immediately preceding or succeeding symbol, e.g., the late arriving frequencies of a symbol interfering with the early arising frequencies of a succeeding symbol.

Another problem of systems which utilize multiple carriers arises from the fact that the symbol waveforms (transmitted composite analog signal) are periodic and thus, if transmitted continuously, one immediately after the other, give rise most times to sharp discontinuities between symbols. These discontinuities, in turn, produce severe distortion (from the harmonics of the discontinuity) in the succeeding symbol.

One approach to overcoming both the group delay distortion problem and intersymbol discontinuity problem, described in U.S. Pat. No. 4,206,320 for example, is to provide a gap or guard time between symbols to thus reduce intersymbol and discontinuity distortion. That is, the demodulator at the receiving end is arranged to ignore the received signal for a portion of the baud time. Of course, this also increases the transmission time (i.e., increases delay) which, stated in other words, decreases the transmission rate.

SUMMARY OF THE INVENTION

It is an object of the invention to provide an improved system for high speed and reliable transmission of data over telephone channels.

It is another object of the invention to provide such a system capable of transmitting data accurately at up to at least 19,200 bits per second.

It is a further object of the invention to provide such system capable of reducing intersymbol distortion without introducing delay or reducing the transmission rate.

The above and other objects of the invention are realized in a specific illustrative embodiment of a multi-carrier high speed modem which provides, at the transmitting end, for generating sets of carrier signals where each carrier signal of a set has a frequency different from the frequency of every other carrier signal of the set, modulating each carrier signal of a set with a different portion of digital data to be transmitted, all such portions which are used to modulate a set of carrier signals constituting a frame of digital data, and successively combining together the modulated carrier signals of each set to produce a frame waveform. Each frame waveform is successively transformed pursuant to an inverse Fast Fourier Transform function from a frequency domain signal to a time domain signal. Then, each transformed waveform is rotated (linear phase shifted) so that its beginning point and slope substantially match the ending point and slope of the immediately preceding transformed waveform. The rotated waveforms are then transmitted with no gap or spacing between waveforms, to a receiving station. At the receiving station, the received waveforms are rerotated substantially to their original condition before rotating. The received, rerotated waveforms are then transformed, pursuant to a Fast Fourier Transform function from the time domain back to the frequency domain. Finally, the received, rerotated and transformed waveforms are demodulated to recover the digital data information.

In accordance with one aspect of the invention, some reference frequencies are added to the waveforms before rotation and some are added to the rotated waveforms, all at the transmitting end. Then at the receiving end, the phase and amplitude of the reference frequencies, which are constant from frame to frame, allow determination of the amount of rotation which has occurred on each waveform. As a result, each waveform may be properly rerotated.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

The system of the present invention, as indicated earlier, is designed for the transmission of digital data over conventional telephone channels such as would be available on the switched telephone network. A specific illustrative embodiment of the system of the present invention allows for transmitting at a speed of 19.2 kilobits per second by employing sets or frames of constant frequency carrier signals, for example, 186 per frame. The carrier signals are amplitude and phase modulated or encoded with binary data, for example, 7 bits per carrier signal to thus yield 1302 bits per frame. The frequency spacing between carrier signals is some fixed amount, for example 15.625 Hz, with the lowest carrier signal frequency set, for example, at 312.5 Hz and the highest carrier signal frequency set at 3203 Hz. After modulation, the carrier signals of a frame are summed to obtain a frame waveform for ultimate transmission to a receiving station where the digital data may be recovered.

Figure 1:
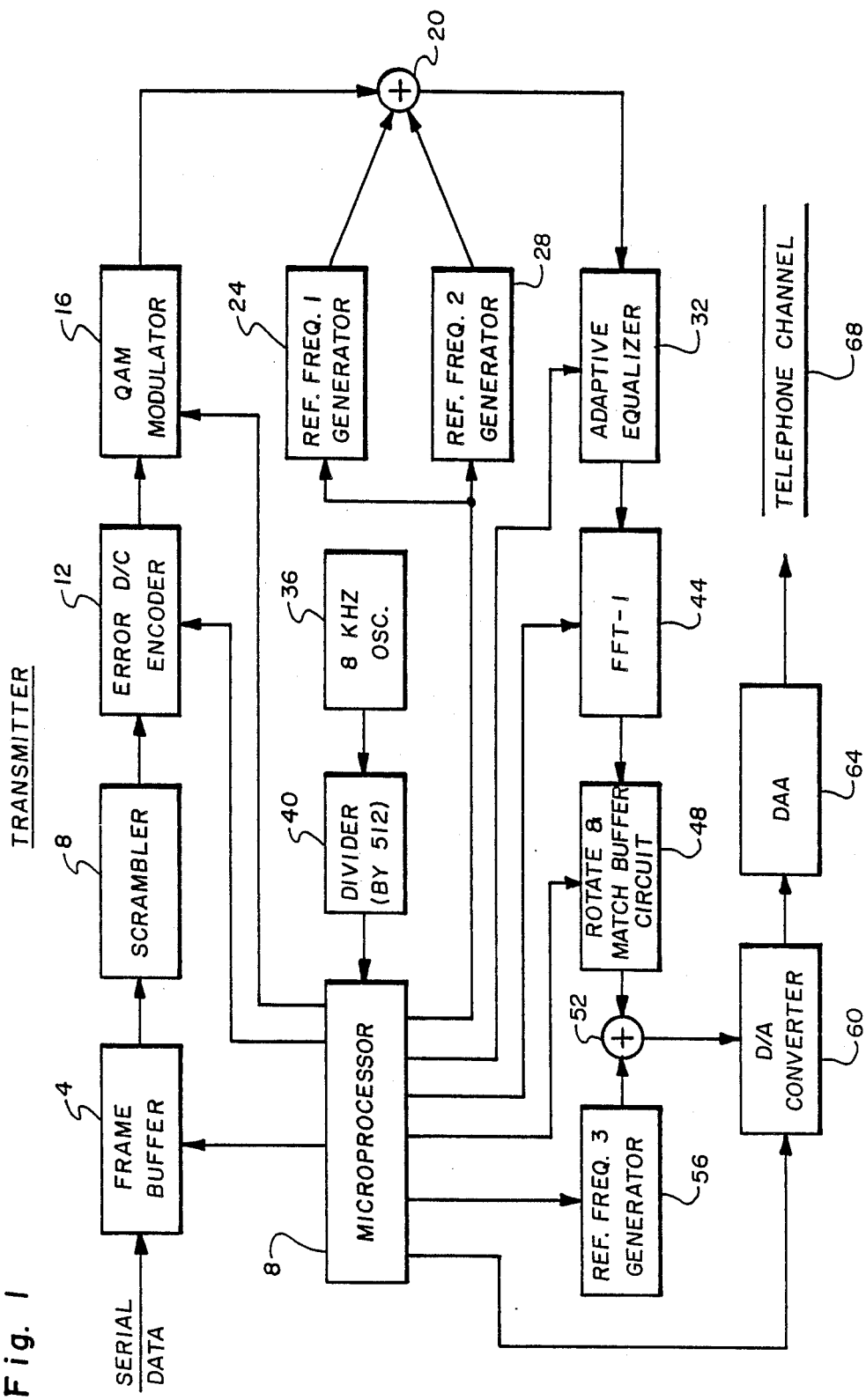
FIGS. 1 and 2 are block diagrams of a modem transmitter and modem receiver respectively, constructed in accordance with the principles of the present invention.

FIG. 1 shows one specific illustrative embodiment of a modem transmitter constructed in accordance with the present invention. The transmitter includes a frame buffer 4 for receiving, temporarily storing, and grouping or framing input serial binary data. The grouping or framing of the input data is carried out under control of a microprocessor 8 which, for example, could be a Texas Instruments' DSP chip 320C255. For the exemplary rates and parameters given above, in order to send digital data at a rate of 19.2 kilobits per second in frames at a rate of 15.625 frames per second, there would need to be included 1228.8 bits of data in each frame. But, the encoding or modulation capacity designated above was for 1302 bits per frame, and so if it is determined that 1229 data bits per frame will be transmitted, there will be 73 surplus bits available in every frame. These surplus bits will be used for error detection and correction purposes as will be described later. In any case, under the determination that 1229 data bits will be transmitted with each frame, the frame buffer 4 should have a capacity to temporarily store at least 1229 bits of data. However, due to commonly occurring inaccuracies with timing clocks, the frame buffer 4 should be selected to store several extra bits, for example 1232, to compensate for the timing inaccuracies.

The frame buffer 4 unloads its stored data, a frame at a time, to a scrambler 8 which randomizes the data in a well known manner to avoid transmission of long sequences of constant or nonvarying data. The scrambled data is supplied to an error detection/correction encoder 12 which adds redundant bits for purposes of error detection and correction. For example, in accordance with the parameter specified above, if each frame includes 1232 bits of data, then 70 bits of redundancy could be added to provide a total of 1302 bits per frame and achieve the desired transmission rate of 19.2 kilobits per second. The error detection and correction encoding could be carried out using a variety of well known encoding techniques, such as block parity or convolutional encoding. Although the encoding function, as well as the scrambler function, is shown as being carried out by individual units, such functions could also be carried out by the microprocessor 8.

Figure 3:
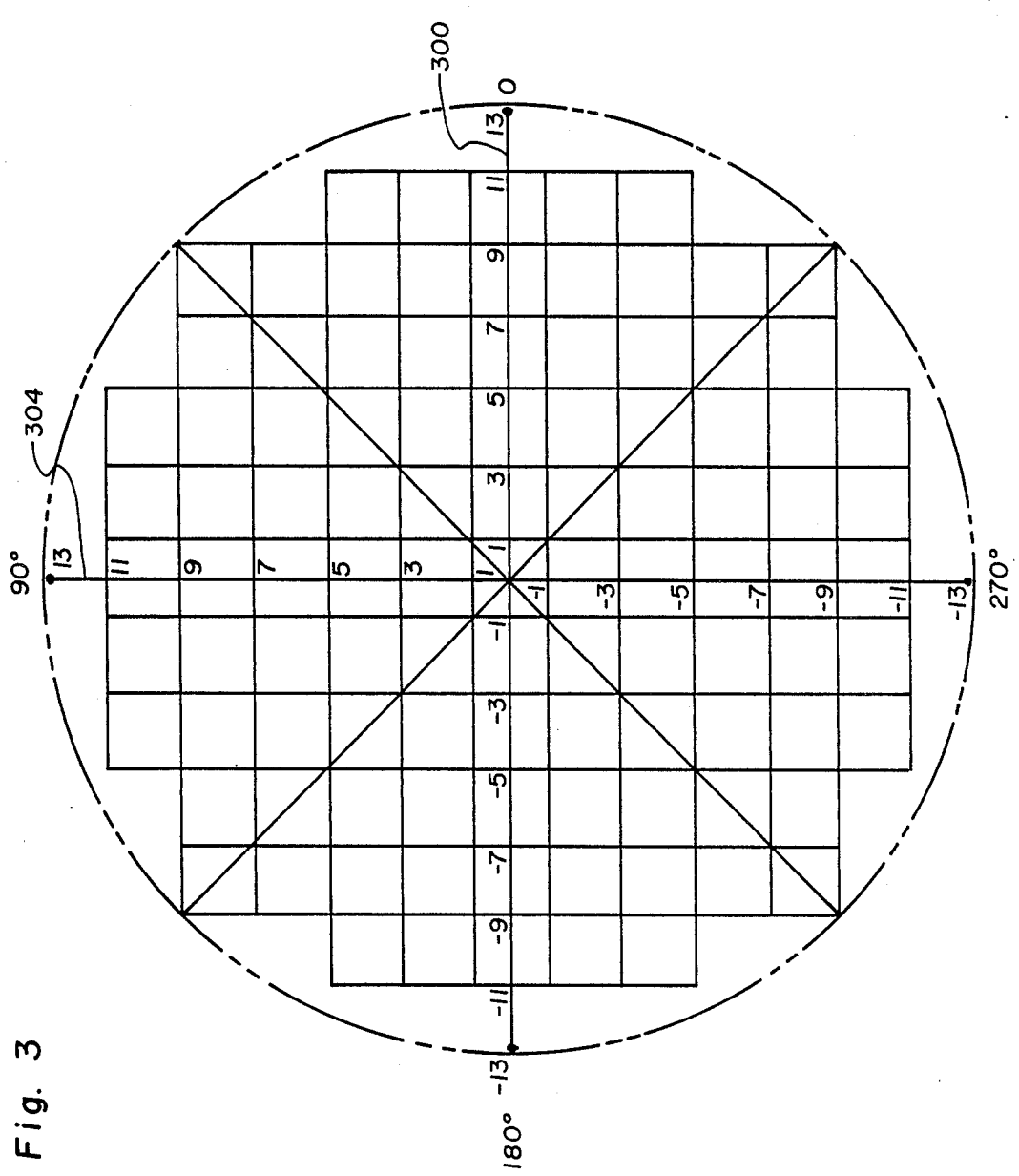
FIG. 3 shows an exemplary constellation and point assignment suitable for use with the present invention.

The encoded data is supplied to a QAM modulator 16 which divides each frame (1302 bits) into 7-bit subsets, where each subset is encoded onto a different one of the carrier frequencies. QAM (which stands for quadrature amplitude modulation) amplitude and phase modulates each of the carrier frequencies with the data bit subsets in accordance, for example, with an equidistant signal constellation such as shown in FIG. 3. There, each intersection of the block lines, plus the four end points of the center horizontal line 300 and the center vertical line 304, define 128 different phase (angular position of a point) and amplitude (distance from center of constellation to the point) for each of 128 different 7-bit data words. That is, each 7-bit data word is assigned a different phase and amplitude in accordance with the constellation and that phase and amplitude is used to modulate one of the carrier frequencies when the corresponding 7-bit word is to be transmitted. The 128 different points are spaced as far apart from every other point as possible in phase and amplitude. The use of such constellations, of course, is well known. QAM modulation is also well known; see, for example, U.S. Pat. No. 4,085,449.

The operation of modulation by the modulator 16 has been described as though a continuous waveform or carrier signal is being modulated (and this will be the ultimate result), but at this stage of the operation of the transmitter of FIG. 1, such operations would be carried out digitally and then later, as will be described, the digital information will be converted to an analog signal.

Following modulation, the carrier signals are supplied to an adder 20, along with two reference frequencies developed by a reference frequency 1 generator 24 and a reference frequency 2 generator 28, which sums all the frequencies to produce a composite frame (or symbol) signal. The reference frequencies 1 and 2 are different from one another and are provided to facilitate rotation and inverse rotation or "rerotation" of the composite frame signals, as will be described later.

Each composite frame signal is supplied by the adder 20 to an adaptive equalizer circuit 32 which "predistorts" the composite signals to be transmitted to compensate for the attenuation effects of typical telephone communication channels. This predistortion involves changing amplitudes of the carrier frequency signals to account beforehand of amplitude distortion which will occur on a telephone communication channel. In effect, the average attenuation as a function of frequency for a communication channel can be determined and the inverse of this function is multiplied with each real and imaginary component of the modulated signals so that after transmission and the expected attenuation, the receiver will receive frequency signals which are closer to those transmitted than would be the case without the predistortion.

The adaptive equalizer 32 supplies the composite frame signals to an inverse Fast Fourier Transform circuit 44 which converts the signals from the frequency domain to the time domain. With the illustrative parameters described above for the modem system of FIGS. 1 and 2, a transmitter clock rate of 8 KHz is selected (thus an 8 KHz oscillator 36 is provided), with each frame consisting of 512 clock cycles (a divider 40 provides a signal to the microprocessor 8 at the beginning and end of each frame, i.e., every 512 clock cycles). With these parameters, the adaptive equalizer 32 supplies to the inverse Fast Fourier Transform circuit 44 successive composite frame signals composed of 512 frequency domain samples consisting of the real and imaginary components of 256 frequencies. These composite frame signals are transformed by the circuit 44 into 512 digital time domain samples per frame and these are supplied to a rotate and match buffer circuit 48.

The circuit 48, under control of the microprocessor 8, successively stores the composite frame signals (represented by the 512 time domain samples) in buffers for the purpose of matching the amplitude and slope of the end of each frame signal with the amplitude and slope of the next succeeding frame signal. This is accomplished by rotating (phase shifting) each succeeding frame signal until a fairly close match is achieved. If the frame signals are thought of as continuous frame waveforms (as they will ultimately be), then the beginning point of each frame waveform can be viewed as being shifted until a point in the waveform is reached where the amplitude and slope at that point closely matches the amplitude and slope of the ending point of the just preceding frame waveform. The reason for doing this is that normally the transition from the end of any frame waveform to the beginning of the next frame waveform would be an abrupt drop or increase in amplitude and this abrupt change, when converted from digital to analog form, would produce transient frequencies and intersymbol or interframe interference upon transmission. One approach to solving this problem in the prior art was to provide an intersymbol or interframe gap so that an abrupt drop or increase in the signal amplitude would be separated by a gap allowing for the change to occur more gradually. See, for example, U.S. Pat. No. 4,206,320, However, this introduces delays and reduces the transmission rate.

Since a Fast Fourier Transform signal is periodic, each composite frame signal will begin and end at the same amplitude and so the signal may be rotated to define a new beginning and ending for the signal and that new beginning and ending will have essentially the same amplitude and slope. Thus, composite frame signals may be rotated (successively phase shifted) so that their new beginning points match in amplitude and slope the ending points of the preceding frame signals; and then the transmitted frame signals may be inversely rotated or "rerotated" at the receiving end to recover the original frame signals or waveforms.

Because each composite frame signal has been randomized (by the scrambler 8), statistically there will likely be several points in the time domain frame signal where the amplitude and slope will match the ending amplitude and slope of the just previous frame signal. The rotate and match buffer circuit 48 simply rotates each frame signal until the slope and amplitude of the beginning two or three samples (of the 512 total) of the frame substantially match the ending two or three samples of the just previous frame. Again, although the equalization, FFT and rotate and match functions are shown as being carried out by individual units, these functions could all be performed by the microprocessor 8 if desired.

When the match described above is achieved, the frame signal being rotated is ready for application to an adder 52. The adder 52 adds each rotated frame signal (assuming rotation is required) to a third reference frequency supplied by reference frequency 3 generator 56. This reference frequency is provided for synchronization purposes, i.e., to identify the beginning and ending of each frame. Since the reference frequency 3 will be added to the composite frame signals after any rotation, it can be used to synchronize the receiver with the transmitter. The frequency of reference frequency 3 will be selected to include an integer number of periods in one frame time. For example, for the 8 KHz clock rate, and a frame consisting of 512 clock cycles, if the reference frequency number 3 is selected to be 296.875 Hz, then there will be 19 cycles per frame for the reference frequency 3. The reference frequency 3 generator 56 supplies a reference frequency signal to the adder 52 such that the polarity of the signal is changed with every frame. In this manner, the beginning and ending of each frame can be readily determined at the receiver as the points of change of polarity of the reference frequency 3 signal, to thus allow synchronization with the transmitter. Reference frequency 3 will also be used, in conjunction with reference frequencies 1 and 2, to determine the amount of rotation of each composite frame signal.

The composite frame signal produced by adder 52 is supplied to a digital to analog converter 60 which produces an analog waveform representation of each frame signal suitable for transmission over a telephone channel. The digital to analog converter 60 supplies the waveform to a data access arrangement circuit 64 which connects the transmitter of FIG. 1 to a telephone channel 68. The DAA circuit 64 includes circuitry necessary for interfacing with the telephone system for among other things, protection of the system, and is of conventional design.

Figure 2:
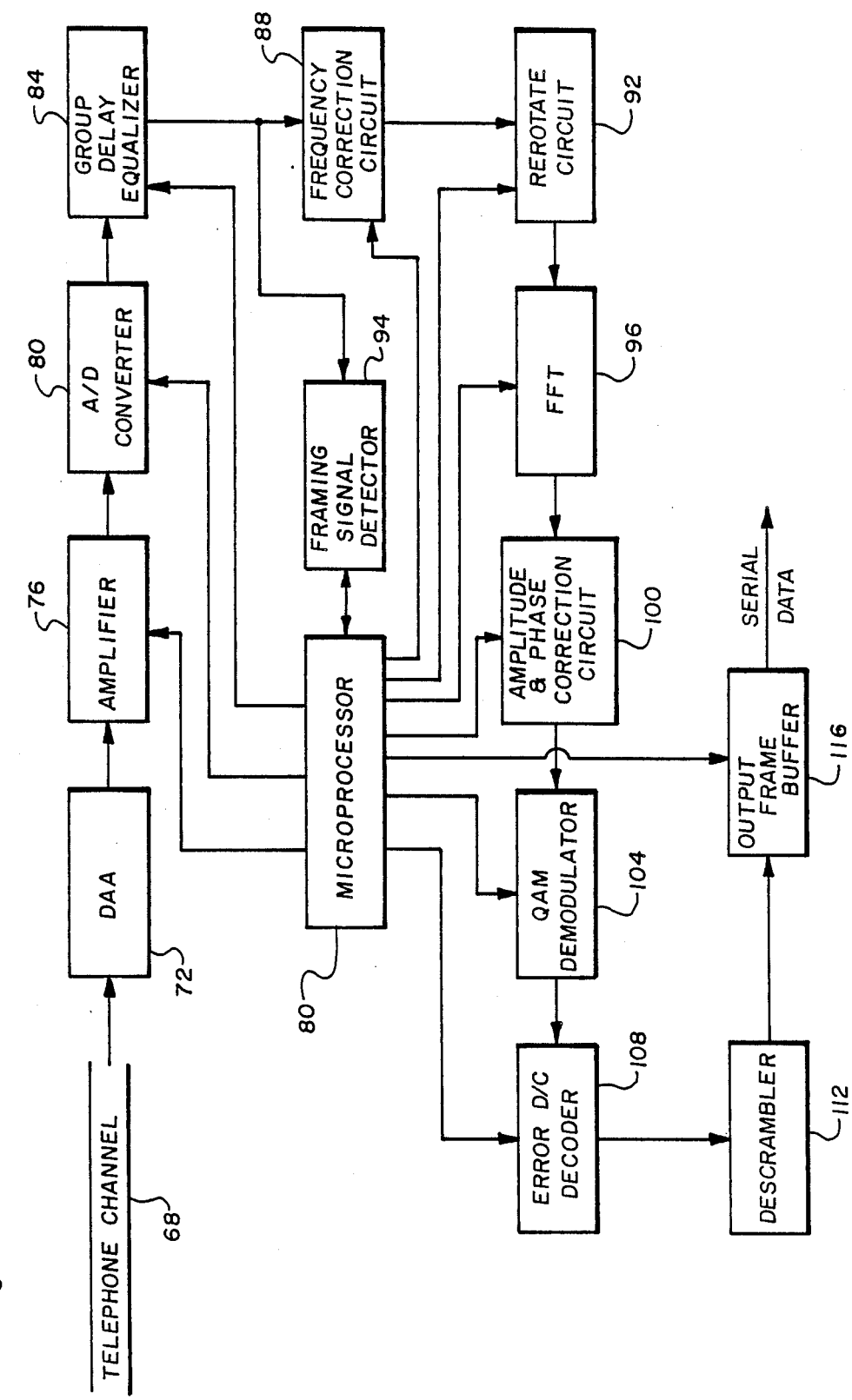

FIG. 2 shows a specific illustrative embodiment of a modem receiver constructed in accordance with the present invention. The receiver includes a data access arrangement circuit 72 for connecting the rest of the receiver circuitry to the telephone channel 68 over which data signals are transmitted. The DAA circuit 72 supplies received signals to a digitally controlled amplifier 76 whose gain is determined by a digital input received from a microprocessor 80. The microprocessor 80, as with the microprocessor 8 of FIG. 1, could advantageously be a Texas Instruments' DSP chip 320C255.

The amplifier 76 amplifies the received signal to a level required by an analog to digital converter 80 to which the amplifier supplies the received signal. This is done by calculating the energy level of a previously converted set of samples from a frame waveform and then computing a new gain value for the next frame waveform. The gain of the amplifier 76 is only changed at frame transition times, i.e., between frames. The analog to digital convertor 80 bandlimits the incoming signal and converts it to a sequence of digital values at a sampling rate of 8 KHz, determined by a sampling strobe received from the microprocessor 8.

The sampled digital signals are supplied to a group delay equalizer circuit 84 which removes the effects of any group delay from a received symbol or frame. Such equalization is well known and is typically carried out by determining from earlier transmission of training frames of known phase what type of delay will occur for the different frequencies transmitted.

The received signals are then supplied to a frequency correction circuit 88 which, in a conventional fashion, corrects for any frequency offsets and phase errors which may have occurred in the signals during transmission. The frequency corrected data is supplied by the frequency correction circuit 88 to a rerotate circuit 92 which buffers the data into 512 sample blocks as defined by the receiver frame timing determined by the microprocessor from a framing signal detector 94. In particular, each change of polarity of the reference frequency 3 signal is detected by the framing signal detector 94 using, for example, a Costas loop detection arrangement to indicate the end of one frame and the beginning of another frame. The framing signal detector 94 signals the microprocessor 80 to indicate the beginning and ending of each frame, and also signals the microprocessor of any frequency shift in reference frequency 3. The latter information is supplied by the microprocessor 80 to the frequency correction circuit 88 to enable it to correct for frequency offset of the composite signal.

With the framing of data properly synchronized, the amount of rotation can be readily determined by examining reference frequencies 1 and 2 which were added to the transmitted signal prior to rotation at the transmitter of FIG. 1, and thus also rotated. Since the two reference frequencies are different, and since the relative phase difference between the two frequencies varies in a uniform way over a frame time period, an examination of this phase difference will reveal the amount of rotation of each frame waveform. For example, if the two frequencies are added to each frame waveform of the transmitter so that the two frequencies are in phase at the beginning of the frame (and of course a predetermined amount out of phase at the end of the frame), then each received frame waveform would simply be rerotated until reaching that point in the waveform where reference frequencies 1 and 2 had a phase difference of zero—that point would indicate the unrotated beginning of the symbol or frame.

Each rerotated frame waveform is supplied by the rerotate circuit 92 to a Fast Fourier Transform circuit 96 which converts the data from the time domain back to the frequency domain using a conventional Fast Fourier Transform algorithm. The transform data is then supplied to an amplitude and phase correction circuit 100. This circuit, in a conventional fashion, corrects the amplitude and phase of the received signals by an amount determined from training signal waveforms initially transmitted. This correction may be implemented in the form of a look-up table developed from the initial training sequences transmitted. The corrected information is then supplied to a QAM demodulator 104 which demodulates the information by comparing the real and imaginary parts of the individual carriers to a stored signal constellation (FIG. 3) and selecting the 7 bit word whose signal point is closest to the received point. The demodulated signals are then supplied to an error detection/correction decoder 108 to determine and correct for any bit errors and the resulting words, stripped of the 70 redundant bits for a total word length of 1232, are supplied to a descrambler 112. The descrambler 112 simply performs the opposite of the scrambling function performed at the transmitter, to recover the true data bits which were to be transmitted. The data is then supplied to an output frame buffer 116 which performs the inverse of the frame buffer 4 of FIG. 1, i.e., unblocks the data, and then supplies the data as a serial bit stream to a receiving or utilization device (not shown).

In the manner described, a modem system is provided where no delays or gaps need be inserted between symbols or frames of transmitted data and thus the delay which would otherwise be incurred is avoided. Intersymbol or interframe interference which is generally caused by sending a sequence of frames where the amplitude between frames abruptly changes, is also avoided by rotating each frame waveform so that its beginning point, in amplitude and slope, substantially match the amplitude and slope of ending point of the just previous frame waveform. At the receiving end, the frame waveforms are rerotated to recover the original signals.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A modem system for transmitting digital data information over a telephone channel or the like comprising
    means for successively generating sets of carrier signals, each carrier signal of a set having a frequency different from the frequency of every other carrier signal of the set and therefore a frequency spacing therebetween,
    means for modulating each carrier signal of a set with a different portion of the digital data, all such portions which are used to modulate a set of carrier signals comprising a frame of digital data,
    means for successively combining together the modulated carrier signals of each set to produce a frame waveform,
    means for successively transforming each waveform, pursuant to an inverse Fast Fourier Transform function, from a frequency domain signal to a time domain signal,
    means for rotating each transformed waveform so that its beginning point and slope substantially matches the ending point and slope of the immediately preceding transformed waveform,
    means for successively and continuously transmitting the transformed, rotated waveforms from a transmitting station to a receiving station,
    means for receiving the transmitted waveforms,
    means for rerotating each received waveform substantially to its original condition before rotating,
    means for transforming each received, rerotated waveform, pursuant to a Fast Fourier Transform function, from a time domain signal to a frequency domain signal, and
    means for demodulating each received and rerotated waveform to recover the digital data information.

2. A system as in claim 1 further including
    means for adding to each waveform first and second constant frequency reference signals whose frequencies are different from each other by a predetermined value and different from the frequencies of the carrier signals,
    means for adding to each transformed and rotated waveform a third constant frequency reference signal whose frequency is different from the frequencies of the carrier signals and the first and second reference signals, and
    wherein said rerotating means comprises means for processing the first, second and third reference signals to determine the beginning of each frame waveform and the degree of rotation of said each frame waveform.

3. A system as in claim 2 wherein said third reference signal adding means includes means for producing each third reference signal 180° C. out of phase with the just previously produced third reference signal.

4. A system as in claim 3 wherein the frequency spacing between carrier signals is 15.625 Hz, wherein the lowest carrier signal frequency is 312.5 Hz and wherein the third reference signal frequency is 296.875 Hz.

5. A system as in claim 4 wherein the number of carrier signals per set is 186, wherein the digital data is binary, and wherein the number of binary digits per carrier signal is 7.

6. A system as in claim 2 wherein said modulating means comprises means for amplitude and phase modulating each carrier signal of a set, and wherein said demodulating means comprises means for amplitude and phase demodulating each received and rerotated waveform.

7. A method of transmitting binary digital data from a transmitting station over a telephone channel or similar band-limited communication channel to a receiving station comprising, at the transmitting station, the steps of grouping the digital data into successive frames of data, each frame having a certain number of groups of data, each of which, in turn, contain a predetermined number of bits, modulating each constant-frequency carrier signal of a set with a respective one of the groups of bits of a frame, each carrier signal of a set having a frequency different from the frequency of every other carrier signal of the set and each modulated carrier signal representing a different group of bits, summing the modulated carrier signals of a set to produce a frame waveform, successively transforming each frame waveform, in accordance with an inverse Fast Fourier Transform function, from a frequency domain signal to a time domain signal, rotating each transformed waveform so that its beginning point and slope substantially match the ending point and slope of the immediately preceding transformed waveform, successively and continuously transmitting the transformed and rotated waveforms to the receiving station, and, at the receiving station, the steps of receiving the transmitted waveforms, rerotating each received waveform to their original unrotated disposition, transforming each received, rerotated waveform, in accordance with a Fast Fourier Transform function, from a time domain signal to a frequency domain signal, and demodulating each frequency domain signal waveform to recover the corresponding frame of digital data.

8. A method as in claim 7 further comprising, at the transmitting station, the steps of adding first and second constant frequency reference signals to each frame waveform, where the frequencies of the first and second reference signals are different from one another and from the frequencies of the carrier signals, adding a third constant frequency reference signal to each transformed and rotated waveform, where the frequency of the third reference signal is different from the frequencies of the carrier signals and the first and second reference signals, and, at the receiving station, the steps of determining the beginning of each frame from the third reference signal, and determining the degree of rotation within each frame from the first and second reference signals.

* * * * *